W. G. RAWBONE.
COMBINED TOOLS FOR FIRE-ARMS.

No. 188,482. Patented March 20, 1877.

WITNESSES
H. H. Warren.
William Norman

INVENTOR
W. G. Rawbone
by Ridout, Aird & Co.
Attys.

N. PETERS, PHOTO-LITHOGRAPHER, WASHINGTON, D. C.

UNITED STATES PATENT OFFICE.

WILLIAM G. RAWBONE, OF TORONTO, ONTARIO, CANADA.

IMPROVEMENT IN COMBINED TOOL FOR FIRE-ARMS.

Specification forming part of Letters Patent No. 188,482, dated March 20, 1877; application filed February 19, 1877.

*To all whom it may concern:*

Be it known that I, WILLIAM GEORGE RAWBONE, of the city of Toronto, in the county of York, in the Province of Ontario, Canada, manufacturer, have invented a combined Loader, Hand Turn-Over, and Extractor for Breech-Loading Guns, which improvement is fully set forth in the following specification, reference being had to the accompanying drawings.

My invention relates to that class of gun implements in which several special tools are embodied in a single implement of great utility and portableness.

Figure 1:
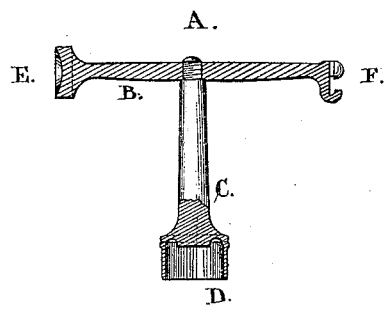
Figure 2:
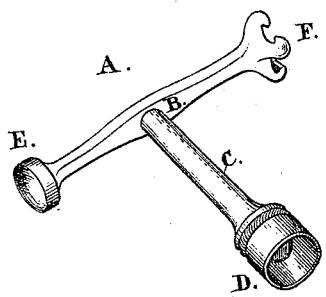

In the accompanying drawing, Figure 1 is a sectional side view, and Fig. 2 a perspective view, of a tool constructed according to my invention.

A is the implement, of a T shape, consisting of two pieces, B and C, connected together by a screw-joint. On the lower end of the piece or stem C a hand turn-over head, D, of the usual construction, is attached, and at either end, respectively, of the horizontal or cross-bar B a loading-head, E, and an extractor, F, is solidly attached or fitted in any suitable manner. The cross-bar B, with the enlargement at each end, forms an excellent and most convenient lever for the application of the hand pushing and turning power required in turning over the rims of paper shells, while the stem, in using the extractor and loader, assists greatly in the application of the strength in the extraction of shells and in loading.

When it is desired to use the extractor only, as when out hunting, the cross-bar may be removed from the stem and used as a single implement. Although the whole implement may be constructed in one piece, for convenience of carriage I prefer to construct it in two parts, fastening together with a screw-joint, so that they occupy, when apart, less room when not in use.

I am aware that the construction of the extractor, loader, and hand turn-over heads is not new, and I make no claim to them; but

I claim as new and desire to secure by Letters Patent—

The combined loader, hand turn-over, and extractor implement A, consisting of the cross-bar B and stem C, joined together in a detachable manner, and provided at their respective ends with a loading-head, a hand turn-over head, and a shell-extractor head, substantially as shown and described.

W. G. RAWBONE.

Witnesses:
GEO. A. AIRD,
H. WARREN.